Figure 1:
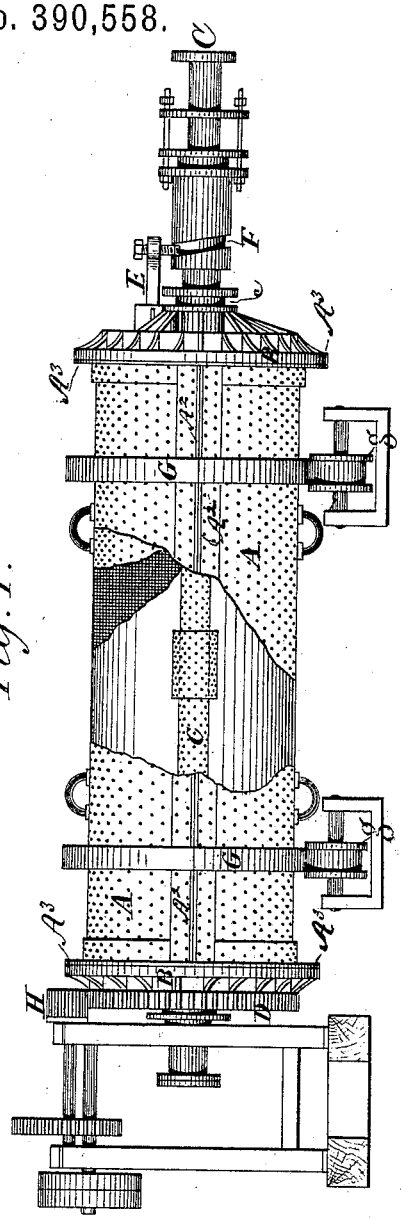

(No Model.) 2 Sheets—Sheet 1.

J. BROCK & T. MINTON.
FILTER PRESS.

No. 390,558. Patented Oct. 2, 1888.

Witnesses
Lloyd B. Wight
Baltus De Jong

Inventors
John Brock
Thomas Minton
By their attys
Baldwin, Hopkins & Peyton (No Model.) 2 Sheets—Sheet 2.

J. BROCK & T. MINTON.
FILTER PRESS.

No. 390,558. Patented Oct. 2, 1888.

Witnesses
Lloyd B. Wight
Baltus De Jong

Inventors
John Brock,
Thomas Minton,
By their attorneys,
Baldwin Davidson & Wight

UNITED STATES PATENT OFFICE.

JOHN BROCK AND THOMAS MINTON, OF BRITISH ALKALI WORKS, WIDNES, COUNTY OF LANCASTER, ENGLAND.

FILTER-PRESS.

SPECIFICATION forming part of Letters Patent No. 390,558, dated October 2, 1888.

Application filed December 20, 1887. Serial No. 258,473. (No model.)

*To all whom it may concern:*

Be it known that we, JOHN BROCK, residing at the British Alkali Works, Widnes, county of Lancaster, England, alkali-manufacturer, and THOMAS MINTON, residing at the British Alkali Works, Widnes, county of Lancaster, England, works manager, subjects of the Queen of Great Britain, jointly have invented certain new and useful Improvements in Filter-Presses, of which the following is a specification.

Our invention relates to that class of filter-presses in which the matter to be treated is fed under pressure through a perforated central pipe in a semi-fluid or sludgy condition, its liquid portion being discharged circumferentially through the filter, which retains the solid; and our improvement consists in certain novel organizations of instrumentalities, hereinafter specifically designated.

The apparatus is designed with a special view to the rapid and complete washing of precipitates and similar substances, so as to remove from them soluble constituents which are either objectionable or of themselves of value.

In the ordinary filter-press the solid and liquid matters which it is desired to separate are pumped in a state of sludge between a series of plates. The solid matter remains in the press and the liquid passes through the filter-cloth and down the surfaces of the various plates of which the filter-press is composed. This results in the spaces intervening between the successive plates being filled up with cakes of the material. This arrangement is, however, defective when it is important that the last traces of any material that the liquid may hold in solution should be removed from the solid material in the press. Endeavors have been made to wash this solution out by pumping water through the press while the cakes were in it. This method is at the best very tedious, the water in great part finding its way out of the press without passing through the cake, with the result that the liquors passing away were extremely dilute, and that to obtain complete washing of the solid cakes great expenditure of water, time, and power were required.

Our filter-press reduces the washing of precipitates to an easy and rapid system.

The machine consists of a cylinder made in two halves axially, so that it can be opened and closed, the halves joining up quite tight by faced surfaces. The inner surface of this cylinder is lined with gauze, over which is filter-cloth. The outer barrel is pierced at intervals to allow of the escape of the filtrate. Through the center of this cylinder, and projecting at each end, is a pipe, by which the feed of material (sludge, &c.) is supplied. This pipe is perforated all along its length inside the cylinder with a number of holes, to insure the equal distribution of the feed and wash water. Each end of the cylinder where this pipe passes through is furnished with a suitable stuffing-box. The cylinder can be caused to revolve on the supports, and it can at the same time be caused to move axially to and fro for a small distance along the feed-pipe by means of a screw-like slot at the other end to that at which the driving-gear is situated. The space through which this slot causes the cylinder to move should, by preference, be rather greater than the distance between the perforations on the feed-pipe.

In using this machine the "cream" or "sludge," consisting of a precipitate, or solid in a state of division and solution or liquid generally, is pumped into the cylinder by way of the feed-pipe. The cylinder is at the same time caused to revolve, and by means of the slot is moved backward and forward along its axis through a small distance. Soon the cylinder becomes full of the sludge, and the pressure inside it rises, causing the solution to pass through the filter-cloth. This goes on till, from accumulation of the solid material in the cylinder, either a cake or, at any rate, a very thick sludge remains in the cylinder. Water or weaker liquor is now pumped into the cylinder, its rotation being continued till the desired standard of purity is attained.

Precipitates and such like bodies, when in a state of mixture with strong solutions from which they must be freed, have usually to be washed many times by decantation before being filter-pressed at all. Using this machine, however, they may be at once pumped into the cylinder and washed clean with the minimum amount of water, labor, and time.

When the contents of the press are considered to be sufficiently washed, the cylinder can be opened at the axial flanges and emptied either by moving the cylinder round or otherwise. The cylinder is then closed, fastened by the bolts shown or other suitable contrivance, and is ready for work again. As the wash-water is always delivered from the center of the cake, it has to pass through the whole of the material lying between its point of issue from the pipe and the filtering-surface before leaving the press, and therefore fulfills the conditions of scientifically-perfect washing with the minimum of water. This is not found in any other press, as far as we are aware.

Figure 2:
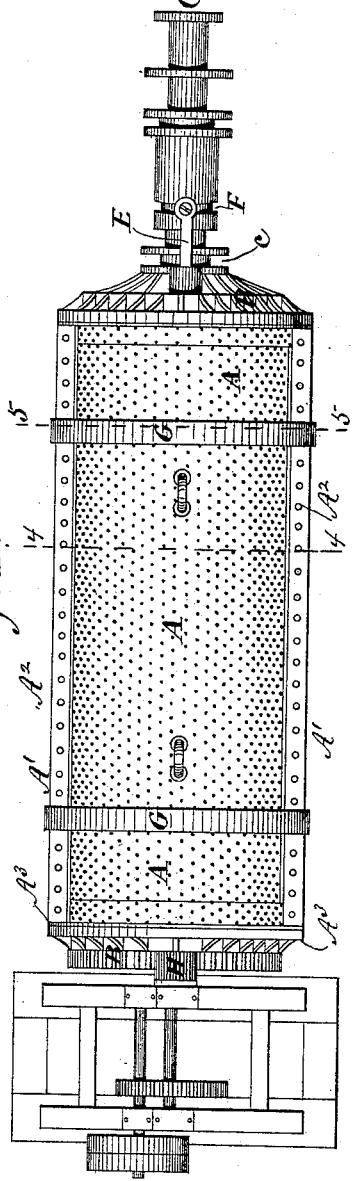
Figure 3:
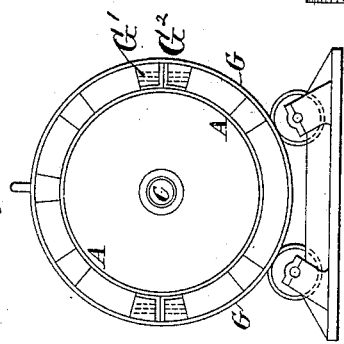
Figure 4:
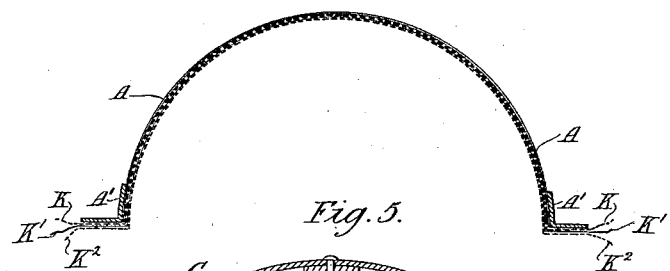
Figure 5:
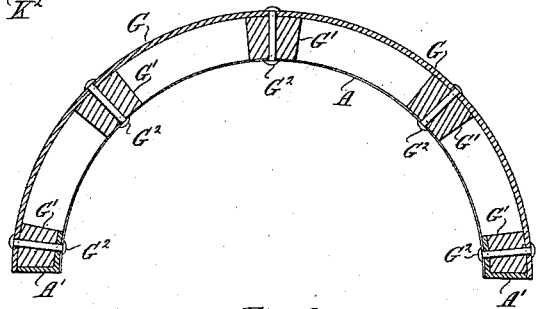
Figure 6:
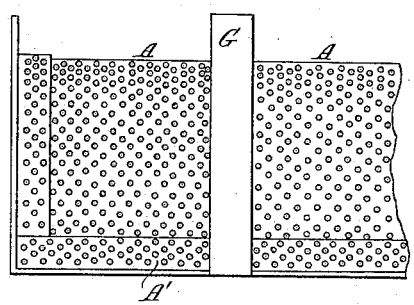

Figure 1 of the drawings hereunto annexed is a side elevation, partly in section, and Fig. 2 a plan view, of apparatus constructed as above described. Fig. 3 is an end view of the cylinder and its supports. Fig. 4 is a cross-section, on a larger scale, taken on the line 4 4 of Fig. 2, of one half of the perforated cylinder and its linings. Fig. 5 is a similar cross section through the line 5 5 of Fig. 2, and Fig. 6 is a side elevation of one end of this half of the cylinder.

A is the perforated cylinder, divided longitudinally into two halves or sections.

B B are end pieces, each formed in any suitable way to fit into the ends of the cylinder.

A' are angle-irons, riveted to the edges of the sections.

$A^2$ are bolts by which the angle-irons along the edges of one section are bolted to the angle-irons along the edges of the other section.

$A^3$ are bolts by which the end angle-irons are bolted to the end pieces, B.

G are bands or rings encircling the cylinder. They are each divided into two halves or sections corresponding with the cylinder-sections.

G' are distance-pieces, interposed between each ring and cylinder-section.

$G^2$ are rivets for holding together the ring and cylinder-sections and distance-pieces.

K is a lining, of twilled wire-gauze, fitting within each cylinder-section; K', a filter-cloth fitting withing the lining K, and $K^2$ an inner lining of wire-gauze placed over the cloth to preserve it and to protect it when the finished product is being discharged.

The edges of the several linings are held between the angle-irons A', and between the angle-irons A' and end pieces, B.

Each end piece, B, has a stuffing-box at its center, through which passes the perforated feed-pipe C. One end has also upon it a toothed wheel, D, by which a revolving motion may be imparted to the cylinder. The other has an arm, E, extending from it and carrying a pin, which enters the cam-groove F, formed around a boss, which is upon the feed-pipe, and gives to the cylinder a to-and-fro endwise movement as it rotates. The cylinder is supported by two rings, G, which surround it, resting on rollers, as shown. The axes of these rollers g can move a distance endwise in their bearings, so as to allow of endwise movement being given to the cylinder. The rings G are in two halves, like the other parts of the cylinder.

H is a pinion, gearing with and driving the toothed wheel D. This pinion is of greater length than the toothed wheel, so that it may remain in gear with it in spite of the endwise motion of the cylinder.

When the press is to be emptied of material accumulated in it, the bolts $A^2$, which retain the two halves of the cylinder together, are taken out and the bolts $A^3$, which retain the half of the cylinder which is uppermost to the ends B, are also removed and the upper half of the cylinder is lifted away. The material can then be broken up and removed.

In some cases it might be sufficient for the cylinder to be revolved without having endwise motion imparted to it. We, however, prefer to give to it both a revolving and endwise to-and-fro motion, as above described.

Having now particularly described and ascertained the nature of our said invention and in what manner the same is to be performed, we declare that what we claim is—

1. The combination, substantially as hereinbefore set forth, of the perforated outer cylinder having closed ends, the filtering material on the inner surface of the cylinder, the perforated delivery-pipe extending centrally through the cylinder, and through which the material to be filtered is forced, and gearing for revolving the cylinder.

2. The combination, substantially as hereinbefore set forth, of the perforated outer cylinder, the end pieces united thereto, the perforated pipe extending centrally through the cylinder, gearing for revolving the cylinder, and an arm secured to one of the ends of the cylinder working in a continuous annular cam groove in the central pipe for imparting an endwise movement to the cylinder as it revolves.

3. The filter-press hereinbefore set forth, consisting of the combination of a stationary, perforated feed-pipe, a perforated cylinder surrounding it, close heads secured to the cylinder, stuffing-boxes in the heads through which the feed-pipe passes, an arm on one of the heads working on a cam groove on the pipe to move the cylinder endwise as it rotates, gearing which rotates the cylinder and permits of its endwise movement, bearing bands or rings on the cylinder, and rollers on which they travel, adapted to conform to the endwise movement of the cylinder, as set forth.

4. The combination, substantially as hereinbefore set forth, of the fixed centrally-perforated feed-pipe through which the material to be filtered is forced under pressure in a semi-liquid or sludgy condition, the perforated filtering-cylinder, gearing for rotating the cylinder, and gearing which imparts to the cylinder a continuous endwise back-and-forth movement along the feed-pipe.

JOHN BROCK.
THOMAS MINTON.

Witnesses:
CHARLES COLLINS,
   *Notary Public, Liverpool.*
LLOYD B. WIGHT.